May 8, 1945.  J. M. DEMPSEY  2,375,287
GREEN DECORTICATING MACHINE
Filed Jan. 20, 1943  2 Sheets-Sheet 1

Inventor
JAMES M. DEMPSEY.
by Charles Dill
Attys.

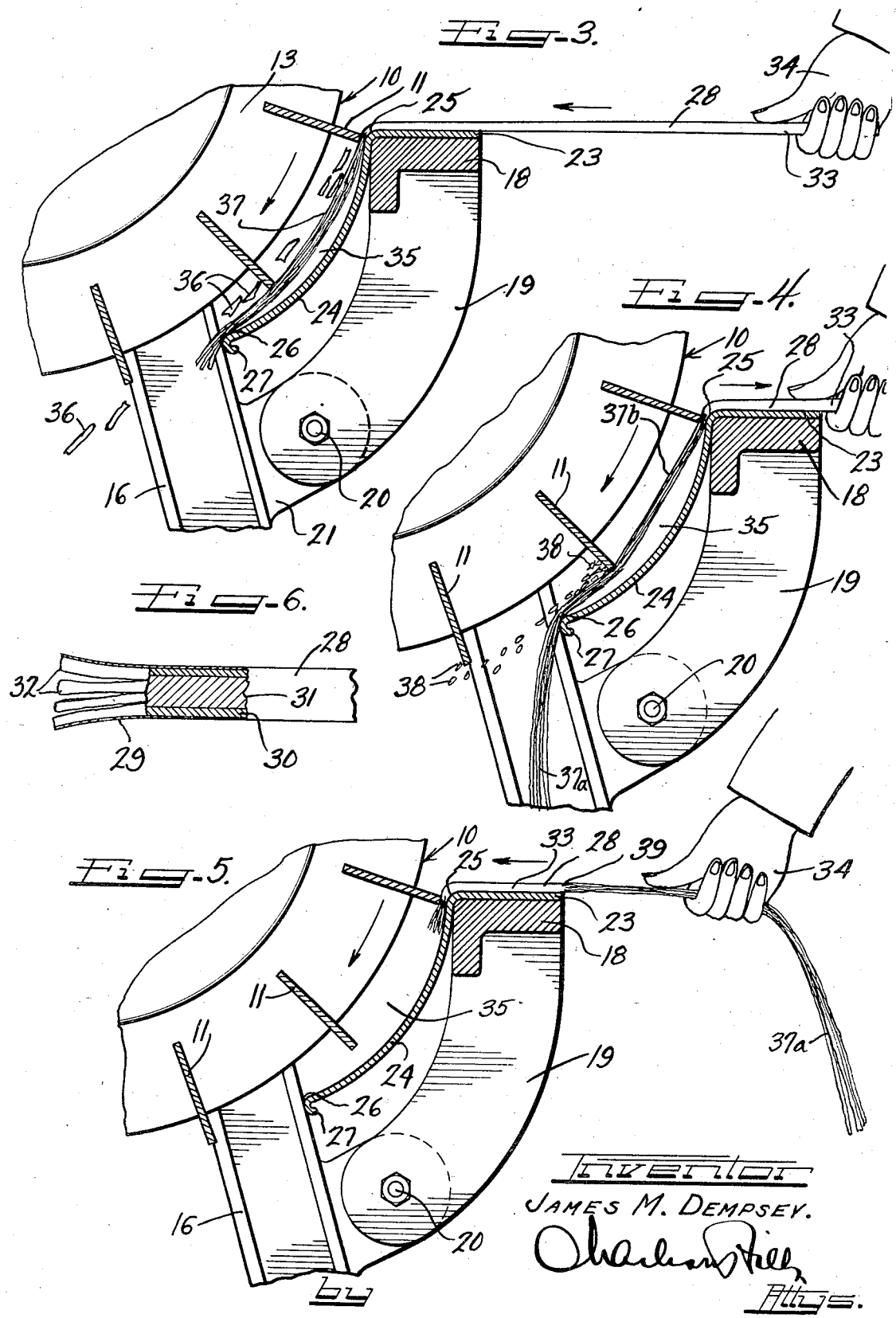

Patented May 8, 1945

2,375,287

UNITED STATES PATENT OFFICE 2,375,287

GREEN DECORTICATING MACHINE

James M. Dempsey, Atmore, Ala., assignor to Newport Industries, Inc., Pensacola, Fla., a corporation of Delaware Application January 20, 1943, Serial No. 472,934

2 Claims. (Cl. 19—26)

This invention relates to an apparatus and to a process for the green decortication of plants, shrubs or herbs for the recovery of useful fibers from such sources. The machine and method about to be described herein have been more particularly developed for the green decortication of plants belonging to the bast fiber family, such as ramie (Boehmieria nivea).

It has heretofore been known to decorticate ramie stalks both by hand and by machine, but the former is uneconomical in this country and the machines heretofore employed for the purpose have proved to be relatively inefficient and unsatisfactory for use here.

I have now developed a machine that involves a new principle, or function, whereby ramie stalks may be decorticated in a green or semi-green state with a maximum yield of useful fiber and with a more efficient separation of the fiber from the non-fibrous constituents of the plant. The new principle involved in the apparatus and method of my present invention is that of restraining or confining the stalks at spaced points in their passage through the machine in order that the intermediate stalk portions between such points may be held under tension like the string of a bow while being subjected to the vibrating, whipping and scraping action of revolving blades or other elements. By virtue of such action, the fibers are more completely and effectively separated from the non-fibrous constituents of the plant, such as the bark and inner woody and pithy portions.

Furthermore, by feeding the stalks first in the direction of their tops, while holding on to their butt ends and then withdrawing the stalks and feeding them in butt-end first, more of the useful fibers of the plant are recovered than has been possible according to previous practices.

It is therefore an important object of this invention to provide an apparatus of improved and novel construction for effecting the green decortication of ramie and other bast fiber plants in a simple yet efficient manner.

It is a further important object of this invention to provide a machine for the green decortication of ramie and similar plants wherein means are provided for holding portions of said plants under tension while subjecting the same to a vibrating, whipping and scraping action that results not only in a more effective liberation of the fibers of the plants but also in a more thorough cleansing of such fibers.

It is a further important object of this invention to provide a method for the green decortication of ramie and other bast fiber plants by the use of which a more efficient liberation of the useful fibers of the plants is obtained, the method involving the novel principle of holding portions of the plant stalks under tension while subjecting them to a combined vibrating, whipping and scraping action.

It is a further important object of this invention to provide a method for the green decortication of ramie and like bast fiber plants, in accordance with which the stalks are fed into an arcuate path where chord-like portions of said stalks are held under tension while being subjected to a whipping and scraping action that sets up vibrations in said chord portions, with the result that the bast fibers are largely freed from the non-fibrous constituents of the plant and may be recovered in a relatively cleaned condition.

Other and further important objects of this invention will be apparent from the disclosures in the specification and the accompanying drawings.

This invention (in a preferred form) is illustrated in the drawings and hereinafter more fully described.

As shown on the drawings:

Figure 3 is an enlarged, fragmentary view of the machine, illustrating the process in the same initial stage as is shown in Figure 1;

Figure 4 is a similar, enlarged, fragmentary view of the machine, illustrating a later stage in the operation of the decorticating process;

Figure 5 is a similar, enlarged, fragmentary view of the machine, illustrating a final stage in the decorticating process; and Figure 6 is a fragmentary view of a stalk of ramie, partly broken away and in section.

Figure 1:
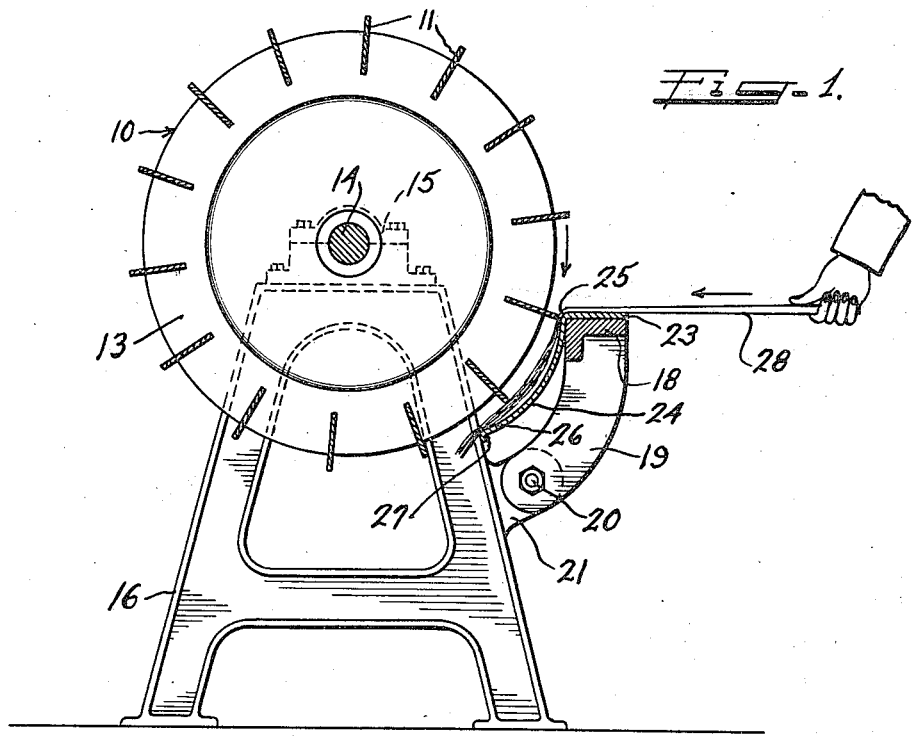
Figure 1 is a transverse sectional view of a green decorticating machine embodying the principles of my invention, illustrating an initial stage in the decorticating operation.
Figure 2:
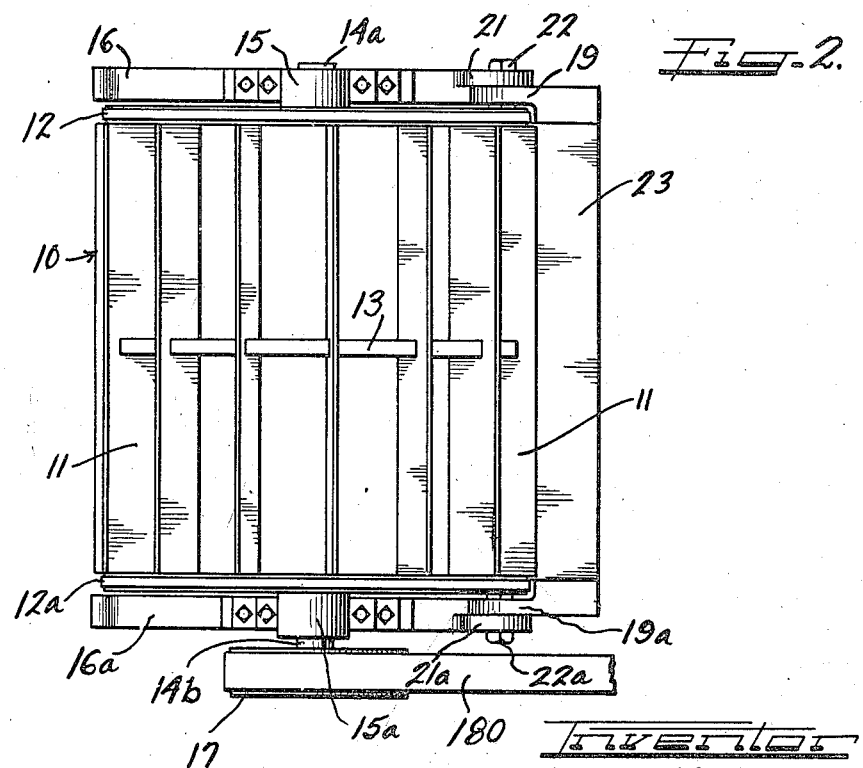
Figure 2 is a top plan view of the machine.

The reference numeral 10 indicates generally a rotatable blade-carrying member, comprising a plurality of blades 11 mounted in and extending between end disks or plates 12 and 12a. An intermediate disk 13, having inwardly extending, radial slots for receiving said blades 11, serves to brace and rigidify the middle portions of said blades. The end disks 12 and 12a and the intermediate disk 13 are rigidly mounted upon a shaft 14 which extends through said end disks to provide stub axles 14a and 14b, which are journaled in bearings 15 and 15a mounted upon supporting standards 16 and 16a. The axle 14a carries a drive pulley 17 driven through a belt 18b from a suitable source of power (not shown).

A bar 18 extends along the operating side of the machine between the supporting standards 16 and 16a, on which it is tiltably mounted by means of arcuate-shaped arms 19 and 19a. The lower ends of said arms 19 and 19a are mounted by means of pivot pins 20 upon brackets 21 and 21a and may be integrally formed with said standards 16 and 16a. Nuts 22 and 22a threaded upon the pins 20 serve to hold the arms 19 and 19a in adjusted position, when said nuts are tightened home. As illustrated, the bar 18 is brought into closely spaced relationship to the cylindrical path of the working edges of the revolving blades 11, the amount of clearance to be provided depending upon the type and size of the fiber-yielding stalks or other portions of a plant that are to be decorticated.

A plate 23 rests upon and is suitably secured to said bar 18 and is formed with a freely dependent, arcuate shaped portion 24 which serves as a bed-plate in a manner that will later be described in greater detail in connection with the operation of the machine. It should be noted here, however, that the bed-plate 24 is formed upon a shorter radius than the radius of the arc defined by the edges of the blades 11, so that said bed-plate is more closely spaced with respect to the arc of the blade edges at its upper and lower extremities 25 and 26. The lower edge of said bed-plate 24 is rolled upon itself, as at 27, to strengthen and rigidify said edge.

As shown, the plate 23 and bed-plate 26 are formed integrally. They may be suitably stamped from a single sheet of relatively light gage sheet metal. A certain amount of resiliency or "give" in the bed-plate 26 is believed to be desirable.

As illustrated, the machine shown in the drawings is being operated to decorticate ramie in a green or semi-green state. For the purpose of better illustrating the operation of the machine, its decorticating action upon a single stalk of ramie, illustrated by the reference numeral 28, will be described. Ramie grows to a height varying from three to eight feet in length at the time of harvesting. Stalks cut for decortication in a machine such as here described may vary from a thickness of about three-quarters of an inch at the butt end to a thickness of about three-sixteenths of an inch at the top end. The stalks will usually have a few leaves up toward the top and at the time of harvesting may have buds or flowers surrounding the stalk for the upper few inches of its length. These leaves and buds or flowers offer no particular problem in the decorticating operation and have been omitted from the showing in the drawings, merely for ease of illustration.

As shown in Figure 6, a ramie stalk 28 comprises an outer bast layer 29 in which all of the useful fibers of the plant are situated. In the growing plant, the fibers are enveloped by a thin skin or bark and are embedded in hemi-cellulosic substances that include the pectins. Inside of the bast layer 29 is a layer of woody substance, indicated by the reference numeral 30, which has a central canal filled with pith, indicated by the reference numeral 31. When an end of the ramie stalk 28 is subjected to an impact, or other sharp blow, or is severely bent, the layer of woody material 30 breaks quite readily, but the bast layer 29, because of the great strength of the fibers contained therein and the cohesive strength of the gums surrounding said fiber, does not break but tends to split longitudinally, as indicated at 32 (Fig. 6).

The design and operation of my machine takes into account this characteristic of ramie stalks. For instance, with a machine such as that illustrated, in which the diameter of the arc described by the blade edges is about 18 inches and in which there are 14 blades equally spaced about the periphery of the rotating element 10, the rotating element should be driven at a speed in the neighborhood of 800 R. P. M. This would correspond approximately to a linear speed of the working faces of the blade of about 63 feet per second. With the machine operating at that speed, the ramie stalk 28 should preferably be fed into and out of the machine at a rate of between about six and two feet per second in order to obtain the most satisfactory result.

It will be understood, of course, that considerable latitude is permitted in connection with the design and speed of rotation of the rotatable element of the machine, as well as in the rate of feed of the plant element into the machine, but in the case of ramie stalks, the figures given are illustrative of good practical working conditions for the green decortication of the ramie. It would be found that if the rotating element 10 were greatly speeded up, for instance, that the blades 11 would tend to cut through both the central woody portion of the ramie stalk and also the bast fibers, with a result that the fibers would be completely destroyed. On the other hand, if the speed of the rotatable element 10 were reduced much below that indicated as the preferred linear speed of the working edges of the blades, the blades would tend to bend down the portions of the ramie stalk with which they came into contact and would not effectively separate the fiber from the interior woody or pithy portions of the stalk by breaking the latter. These two conditions, therefore, determine the upper and lower limits of the linear speed of the working edges of the blades of the rotating element 10.

As illustrated in Figure 3, the stalk of ramie 28 is fed toward the rotating element 10 in the direction of the top end of the stalk, while the butt end 33 is grasped by the hand 34 of the operator. The downward rotation of the blades 11, in cooperation with the closely spaced upper edge 25 of the bed-plate 24, tends, of course, to draw the stalk in between the revolving blades and the bed-plate 24 at approximately the speed of rotation of the blades. The operator, however, exerts a restraining action upon the forward movement of the stalk 28 to retard the speed of advancement of the stalk toward the working elements of the machine to a rate, as previously mentioned of between about six and two feet per second. This causes a relative movement between the working edges of the blades 11 and the portions of the stalk with which these blades come into contact, with the result that the blades exert a breaking and scraping action lengthwise of the fibers of the stalk.

Mechanical means may, of course, be provided for feeding the stalks into the machine but the process is also capable of being carried out by hand. The arrows on Figs. 3 to 5 inclusive indicate the direction of rotation of the blades and also the direction of movement of the ramie stalk.

In the first stage (Fig. 3), the ramie is advanced, top first, until all except the butt end 33 has passed into the arcuate passage 35 between the arc described by the blade edges and the curved bed-plate 24. Upon the advancement of the stalk into the path of the blades, the inner portions of the stalk are broken up into shives 36, which are thrown outwardly and downwardly by the rotating blades 11. The partially liberated fibers, which are indicated by the reference numeral 37, are scraped by the rotating blades as the fibers are advanced through the passage 35 by the action of the blades. When the length of the partially liberated fibers 37 is sufficient to hang over the lower edge of the bed-plate 26, there is a tendency of the moving blades to place the fibers under some tension between the upper and lower edges 25 and 26 of the bed-plate, due to the greater linear speed of the blade edges as compared with the rate of advance of the stalk and, consequently, of the fibers 37 that is permitted by the operator. As a result of this tensioning effect, the intermediate portion of the fibers 37 tends to be held more or less taut, out of contact with the surface of the bed-plate 24 between its upper and lower edges and in contact with the revolving blades. This makes for a more effective scraping action of the blades over the fibers to remove shives from the fibers.

However, the tension that is set up in the partially liberated fibers during the feeding in of the stalks is not nearly so pronounced as that which is brought about during the reverse movement of the stalk. As shown by the arrow adjacent the butt end 33 in Fig. 4, the operator starts to withdraw the stalk when all except a few inches of the butt of the stalk have passed into the machine. The resistance to withdrawal that is then set up, both by the snubbing action of the length of fibers 37a hanging over the lower plate edge 26 and by the friction of the downwardly moving blades, draws taut the intermediate length 37b of said fibers between successive blades, so that said length 37b is held out straight along a chord of the arc described by the blade edges. The consequence is that the scraping of the fibers by the rapidly moving blades is even more thorough and effective than during the in-feeding of the stalk. Furthermore, a rapid vibration is induced in the fibers of the length represented by the reference 37b, much the same as a bow string is set to vibrating by being scraped or plucked. This composite effect of the scraping action of the blades and the vibrating action of the fibers gives rise to what may be properly described as a whipping or flagellating action on the fibers. As a result, much of the enveloping bark and of the gummy substances surrounding the individual fibers and holding them united is detached in the form of small fragments 38 that are thrown outwardly and downwardly by the centrifugal action of the revolving blades in combination with the action of gravity.

After the operation illustrated in Fig. 4 has been completed, the stalk is then reversed and the butt end 33 advanced into the machine. The decorticating action that now takes place is similar to that described in connection with the initial stage of the operation illustrated in Fig. 3. As soon as the butt end has been drawn into the machine up to the point where the fibers have already been liberated, indicated at 39 (Fig. 5), the fibers are drawn back out of the path of the revolving blades as before. It is not good practice to advance the butt into the machine further than is necessary to complete the liberation of the fibers of the stalk, since if it were carried further, loss of fiber would result and the overall yield of fiber would be less.

At the completion of the operation above described, the recovered fibers are ready for such further operations, as degumming and bleaching, that are required if the ultimate fibers are to be fully prepared for spinning, weaving or other similar purposes, or for making into paper.

It will, of course, be understood that various details of construction may be varied through a wide range without departing from the principles of this invention and it is, therefore, not the purpose to limit the patent granted thereon otherwise than necessitated by the scope of the appended claims.

What I claim is:

1. In a machine for the green decortication of fiber bearing plants, a rotatable member carrying a plurality of peripherally spaced blades the working edges of which during rotation define a cylindrical path, an arcuate bed plate arranged for its effective length wholly below the horizontal plane of the axis of said cylindrical path and of sufficient length to cooperate simultaneously with at least two of said blades during rotation, said bed plate being formed of curved sheet material having upper and lower portions more closely positioned than intermediate portions to said cylindrical path to define restricted entrance and exit passages in which spaced portions of said stalks are restrainingly held against said blades during rotation, whereby intermediate plant portions can be placed under tension and held out of contact with said plate intermediate portions, and means for rotating said blade-carrying member to cause said blades in cooperation with said bed plate to feed said plants through said restricted passages and to flagellate the tensioned intermediate portions of said stalks to effect a fiber liberating and fiber cleansing action.

2. In a machine for the green decortication of fiber bearing plants, a rotatable member carrying a plurality of peripherally spaced blades the working edges of which during rotation define a cylindrical path, an arcuate bed plate arranged for its effective length wholly below the horizontal plane of the axis of said cylindrical path and of sufficient length to cooperate simultaneously with at least two of said blades during rotation, said bed plate being formed of curved sheet metal free at its lower end to provide a certain amount of resiliency and having upper and lower portions more closely positioned than intermediate portions to said cylindrical path to define restricted entrance and exit passages in which spaced portions of said stalks are restrainingly held against said blades during rotation, whereby intermediate plant portions can be placed under tension and held out of contact with said plate intermediate portions, and means for rotating said blade-carrying member to cause said blades in cooperation with said bed plate to feed said plants through said restricted passages and to flagellate the tensioned intermediate portions of said stalks to effect a fiber liberating and fiber cleansing action.

JAMES M. DEMPSEY.